United States Patent [19]
Rodriguez

[11] 3,728,022
[45] Apr. 17, 1973

[54] DODGING CIRCUITRY FOR PHOTOGRAPHIC PRINTING APPARATUS

[75] Inventor: Juan Antonio Rodriguez, Rochester, N.Y.

[73] Assignee: Eastman Kodak Company, Rochester, N.Y.

[22] Filed: Oct. 7, 1971

[21] Appl. No.: 187,477

[52] U.S. Cl. .................................. 355/80, 355/38
[51] Int. Cl. .................................. G03b 27/76
[58] Field of Search .................. 355/38, 80, 81, 83

[56] References Cited

UNITED STATES PATENTS 3,482,916  12/1969  Mey et al. .................. 355/38
3,531,199  9/1970  Burger et al. .............. 355/83 X
3,426,357  2/1969  Paulus ........................ 355/83 X
3,544,214  12/1970  Edgar ........................ 355/83 X

*Primary Examiner*—Samuel S. Matthews
*Assistant Examiner*—Fred L. Braun
*Attorney*—W. H. J. Kline et al.

[57] ABSTRACT

In a photographic printing device, apparatus for extending the exposure time at reduced illumination to thereby provide more dodging time by the apparatus operator. An alarm is activated to warn the operator where one or more corrective filters are about to be inserted in the print beam path, so the operator will be informed that the time to accomplish dodging is ending.

4 Claims, 2 Drawing Figures

3,728,022

JUAN A. RODRIGUEZ
INVENTOR.

BY Cyril A Krenzer
W.H.J. Kline
ATTORNEYS

DODGING CIRCUITRY FOR PHOTOGRAPHIC PRINTING APPARATUS

CROSS REFERENCE TO RELATED APPLICATIONS

Reference is made herein to copending patent application, Ser. No. 187,481 filed 9/30/71 and assigned to the same assignee as is the present application.

BACKGROUND OF THE INVENTION

This invention relates generally to photographic printing apparatus and more particularly improved dodging control circuitry for use in a subtractive color photographic printer or enlarger.

In many cases discrete areas of a film transparency are too dark or too light with respect to the rest of the film transparency to print satisfactorily. In such cases, the exposure that the transparency receives can be selectively modified by so called dodging techniques. Dodging, or blocking as it is sometimes known, is the technique of localized printing by shading or spot printing, which is commonly accomplished by making a cutout, for example, of the desired shape and holding the cutout over the related area of the photographic paper during part of its exposure. In the case of shading, the cutout is used to permit less exposure of a discrete area than that of the remaining area of the print and in the case of spot printing, the cutout is a mask to permit more exposure of the discrete area than that of the remaining area of the print. With both methods, the cutout is moved during the period of use to avoid creating a sharp edge on the effected area of the print. Sometimes rather than use a cutout, the printer operator will use his hands for the dodging operation.

In a subtractive type of color printer or enlarger, the dodging must be performed during the three color, or white light, portion of the exposure. In general, the color unbalance of a negative requires unequal exposures to red, green and blue light. This presents a problem of how to advise an operator that the allowable time limit for dodging has been reached, especially in the instances where the printing apparatus is highly automated and the exposure time is not actually known. Depending on the color balance of any particular film transparency, any of the subtractive color filters can be inserted first or last. It is, of course, recognized that for a given print, only two at most of the three corrective color filters are inserted into the print beam path during the exposure cycle. In many instances the operator will not known which filter is inserted first, or when it is inserted.

An additional problem is often encountered when dodging is attempted, since the exposure time may be extremely short, in which case it is very difficult to accomplish effective dodging.

If the dodging is inadvertently carried on into the time that one or more of the subtractive filters are inserted into the light path, the dodging can upset the color balance that the filter correction system is trying to establish. Generally in the prior art, it is necessary to significantly extend the exposure time by some factor and to reduce the intensity of printing illumination by the same factor, during which period the operator performed his dodging operation, never being quite sure whether or not the corrective filters were being inserted into the light path. This, of course, led to inefficiencies in the system since quite often the exposure time was needlessly extended, or conversely in some cases the exposure time was not sufficiently extended and the dodging time inadvertently extended into the period when the subtractive filters were inserted in the beam, thus producing an unbalanced print.

OBJECTS AND SUMMARY OF THE INVENTION

Accordingly, it is a principle object of this invention to provide improved dodging control circuitry for use with exposure control circuitry in color printer apparatus which overcomes the disadvantages of the prior art devices.

Another object of the invention is to provide improved dodging control circuitry capable of automatically extending the exposure time when in the dodging mode.

Yet another object of the invention is to provide improved dodging control circuitry which gives an indication that the white light portion of the print exposure is nearing completion.

Briefly, according to one embodiment of the invention, the dodging control circuitry is a modification of the normal exposure control circuitry, which may include, for example, a timing capacitor to establish a time constant for each of the red, green and blue exposure times. In the dodging mode, additional capacitance is incorporated in parallel with the principal capacitors to thereby extend the exposure time to facilitate the dodging of the print. A zero or reference level detector circuit is connected into each of the three color channels of exposure control circuitry to obtain therefrom a signal which is indicative of the fact that the filter associated with the particular channel is about to be inserted into the light path. The signal from the detector circuit drives an OR gate connected to an alarm circuit operative to indicate to the operator that the first of the corrective filters is about to be inserted into the light beam. The alarm circuit is set so that the operator has sufficient time to remove the dodging apparatus from the light path before the corrective filter is inserted therein.

DESCRIPTION OF THE PREFERRED EMBODIMENT

The foregoing and other and further objects and advantages of the present invention will be better understood from the following description taken in conjunction with the above described drawings.

Figure 1:
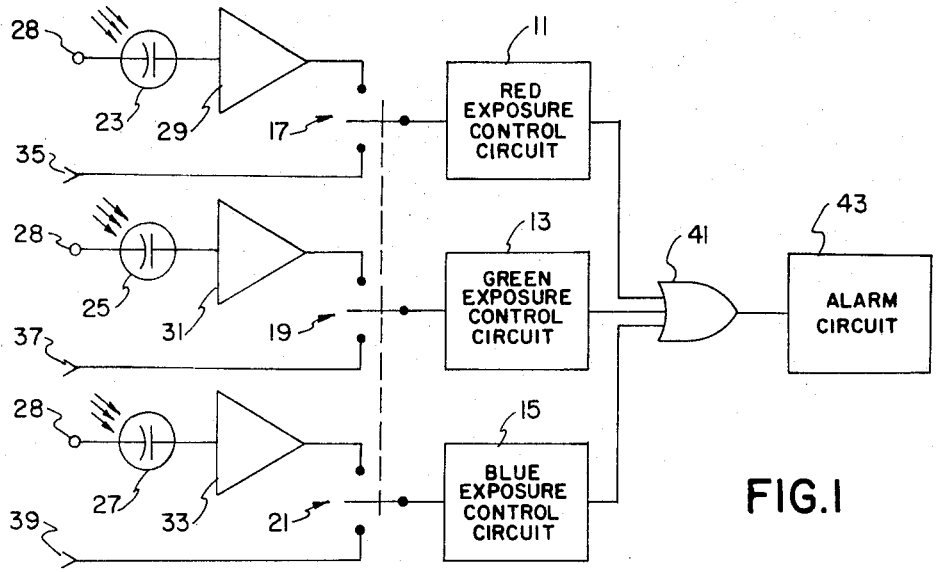
FIG. 1 is a partial schematic diagram illustrating one embodiment of exposure control circuitry in which the present invention finds utility.

Referring first to FIG. 1, therein is shown the exposure control circuitry of a printer or enlarger in which the present invention finds utility. As illustrated, there is contemplated a three-color system wherein the film transparency has had evaluated its three basic color components, i.e. red, green and blue and in some instances may have its relative density determined. There is a separate exposure control circuit 11, 13 and 15 for each of the basic color components. These circuits are connected at their inputs by single-pole, double-throw switches 17, 19 and 21, respectively, which are ganged together so that they will all be in the same mode of operation. Each color channel has associated therewith a photomultiplier tube input 23, 25 and 27 respectively which are connected by a current to voltage converters 29, 31 and 33, respectively to the upper contacts of the respective switches. One contact of each of the photomultiplier tube is connected to a source of energizing potential 28. Second inputs 35, 37 and 39 are connected respectively to the lower input contacts of each of the switches 17, 19 and 21. For the dodging mode of operation with which the present invention is principally concerned, the outputs of the exposure control circuits 11, 13 and 15 are connected to the inputs of an OR gate 41, the output of which is applied to an alarm circuit 43.

The system as shown in FIG. 1 illustrates that the apparatus is capable of being operated in what may be described as a real time base, wherein the film transparency is being analyzed or monitored during the actual exposure of the film transparency by the photomultiplier tubes. In such a case the apparatus used in conjunction therewith could be the apparatus described in copending application, Ser. No. 187,481 assigned to the same assignee as is the present application. On the other hand, the system could just as well utilize color correction information which has been derived prior to the time that the film transparency is placed in the color printer. For example, the corrective information could be determined by an electronic color viewer such as shown in U.S. Pat. No. 3,351,707 issued on Nov. 7, 1967. In the later case, the prederived color correction information would be applied to the input terminals 35, 37 and 39.

In either situation, the corrective information is applied to the inputs of the exposure control circuits 11, 13 and 15 via the switches 17, 19 and 21, respectively. The exposure control circuits are operative in a manner hereafter to be described to control the exposure time for each of the respective colors in a subtractive mode, such that once each of the color exposures is complete, its respective color filter is inserted into the path of the print beam.

As will become apparent from the description to follow, the exposure control circuits 11, 13 and 15 include sensing means which detect the point at which a particular color has received full exposure and in response to which a suitable filter is inserted into the print beam. A second sensing means provides a signal output to the OR gate 41 which is operative to activate an alarm 43. The OR gate 41 operates on the first of the signals derived from the three channels, which indicates that the white light portion of the exposure is complete, and as previously discussed, this is the end of the time allowed for dodging of the print. Therefore, even though the operator does not know the actual amount of time available for dodging, he will be properly warned when that time is ended.

Figure 2:
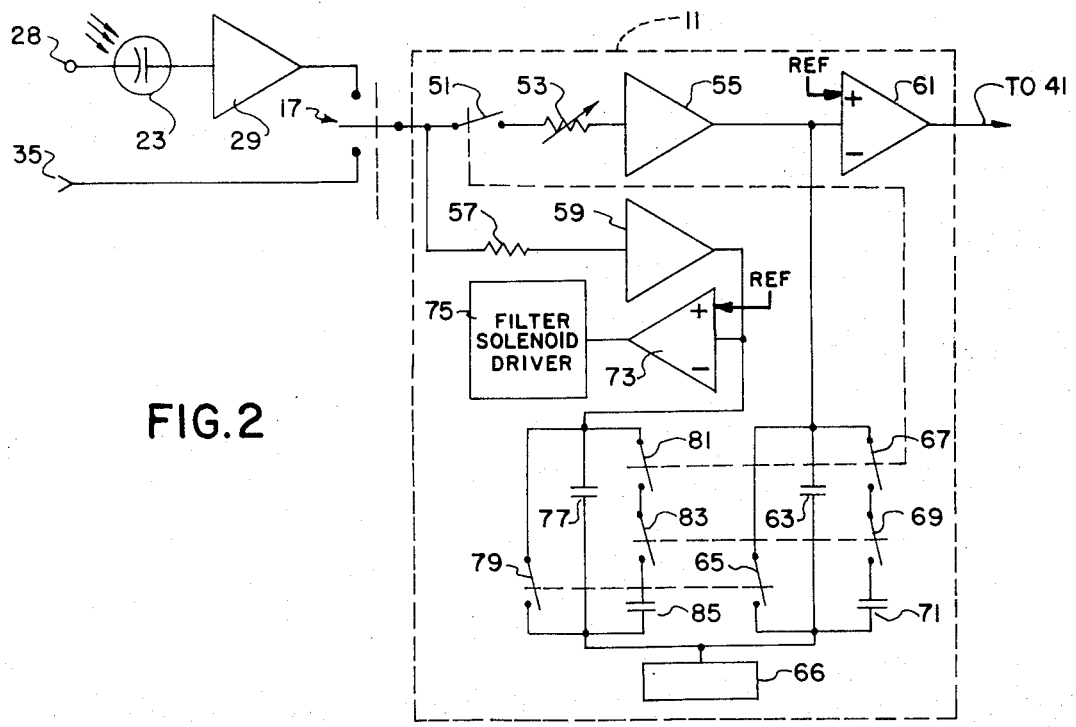
FIG. 2 is a schematic of one channel of dodging control circuitry according to the present invention.

Referring next to FIG. 2, therein is shown in expanded detail one channel of the exposure control circuitry and apparatus of FIG. 1. If we assume that we are concerned with the first channel of the circuit of FIG. 1, we have the photomultiplier tube 23 connected by the current-to-voltage converter 29 to the top terminal of the switch 17. The input 35 is connected to the bottom terminal of the switch 17. The input to the exposure control circuitry 11 is connected by a switch 51 through an adjustable resistor 53 to a current generator 55 which provides a constant output for a given input. In parallel therewith, the input is connected by a resistor 57 to a second current generator 59. The output of the current generator 55 is connected to the input of a reference level detector circuit 61 and is also connected via a capacitor 63 to a source of reference potential 66 (such as ground). The output of the reference level detector 61 is connected to an input of the OR gate 41. Connected in parallel with the capacitor 63 is a switch 65, and also in parallel therewith is a series circuit consisting of first and second switches 67, 69 and a capacitor 71. The output of the current generator 59 is connected to the input of a reference level detector 73, the output of which is connected to a filter solenoid driver 75. Also the output of the generator 59 is connected by a capacitor 77 to the source of reference potential 66. In parallel with the capacitor 77 is a switch 79, which is gang connected to the switch 65, and also in parallel with the capacitor 77 is the series circuit consisting of switches 81, 83 and a capacitor 85. In the embodiment as shown, the switches 69 and 83 are ganged together and the switches 51, 67 and 81 are ganged together. In the total embodiment, since the exposure control circuitry of the other channels are identical to the circuitry of FIG. 2, the switches that are ganged together in FIG. 2 could also be ganged to their counterparts in the remaining channels. In actual operation, the reference source 66 may additionally include various adjustment means adapted to provide corrections depending upon the particular type of print paper, etc. that the printer is using.

To describe the operation of the circuit of the present invention, it will be assumed that corrective signal has been derived from an electronic color viewer as previously mentioned and is applied to the input terminal 35 with the switch 17 in its downward position. Prior to exposure, the switches 65 and 79 are closed so that the capacitor 63 and 77, respectively, are shorted out and the potential from the reference source 66 is applied to the output of the current generator 59. If no dodging is to be effected, the switch 51 and its ganged counterparts 67 and 81 are left open. The switches 69 and 83 may be closed, but are still not operative because the switches 67 and 81 are open. Upon commencement of the exposure cycle, the switches 65 and 79 are opened and the capacitor 77 is charged by the current from the generator 59. The charging rate of the current generator 59 is proportional to the potential across the resistor 57 as determined by the signal input on terminal 35. As the charge on the capacitor 77 reaches a certain level, it activates the reference level detector 73, which in turn operates the filter solenoid driver for this channel. The filter solenoid driver is operative thereby to insert a subtractive color filter into the path of the print beam.

If dodging of the print is to be effected, in addition to the previous operation, the switches 51, 67 and 81 are closed and the capacitors 71 and 85 are inserted in parallel with the capacitors 63 and 77 respectively. Concurrently, a suitable neutral density filter is inserted into the print beam path. Then upon opening of the switches 65 and 79, instead of just charging the single capacitor, the current drivers 55 and 59 must charge the additional parallel capacitors. This, of course, increases the amount of time it takes to reach the reference level detected by the level detector circuit 73 and similarly to be detected by the circuit 61. The reason for the adjustable resistor feeding the current generator 55, is to permit increasing the current from the generator 55 as compared to the generator 59, so that the charge on capacitors 63 and 71 will pass the reference level prior to the time the charge on the capacitors 77 and 85 does. Thus the reference detector amplifiers 61 can be activated prior to the reference detector amplifier 73, so that a signal is applied to the OR gate 41, thereby activating the alarm circuit 43 warning the operator to discontinue the dodging mode. This gives the operator time to discontinue dodging prior to the actual insertion of the corrective color filters.

The operation of the circuitry when used with the spot monitor input drives (switches 17, 19, and 21 in their upward position) is essentially the same as that above described. In some cases, the spot monitor will be used with a neutral density filter already injected into the print beam. This has the effect of extending the exposure time by a factor N and decreasing the light intensity of the print beam by the factor N. Thus, the signal applied to the current generator is reduced, so that it is not necessary to insert in parallel the capacitors 71 and 85 with the capacitors 63 and 77, respectively to extend the exposure time to effect dodging. In this later case, while the dodging switch 51 and the corresponding switches 81 and 67 are closed, the switches 69 and 83 are left open. Otherwise, the circuit operates in the same manner, but with the neutral density filter inserted into the print beam, the amount of light impinging on the photomultiplier tube 23 is diminished to thereby effect a lower drive signal thus resulting in the longer exposure time to permit effective dodging of the print. The alarm circuit is, of course, activated in the same manner as previously described.

It will be readily apparent that many modifications may be made to the above described embodiments without departing from the teaching of the present invention. For example, while as described herein, the exposure time is extended by inserting a second capacitor in parallel with a first timing capacitor, it could also be extended by reducing the current output of the current generators.

The invention has been described in detail with particular reference to preferred embodiments thereof, but it will be understood that variations and modifications can be effected within the spirit and scope of the invention.

I claim:

1. For use with color photographic printing apparatus, improved exposure control circuitry having dodging control capability, comprising:

a plurality of channels, one for each of the base colors of the photographic system, each of said channels including an input terminal adapted to receive an exposure control signal to establish the exposure time for the channel, and an output terminal adapted to provide an output signal indicating the end of the exposure time for the channel;

each of said plurality of channels including circuit means operative to establish the exposure time for its respective channel;

each of said plurality of channels further including detector circuit means operative to detect the ending of the exposure time for its respective channel and produce a signal prior to the end of the exposure time for the channel;

gate circuit means adapted to be connected to the output of each of said detector circuit means and operative to produce an output in response to the signal received from that detector circuit means which first detects the ending of the exposure time for its respective channel; and indicator means responsive to an output from said gate means to provide warning to the operator of said printing apparatus whereby the operator is made aware that the permissible time for performing dodging is ended.

2. The invention according to claim 1 wherein said gate means comprises a logical OR circuit having a plurality of input terminals for receiving, respectively, the output signals from each of said plurality of detector circuit means.

3. The apparatus of claim 1, wherein each of said first mentioned circuit means includes an arrangement of parallel capacitors to increase the time to reach a given reference level corresponding to said established exposure time.

4. The apparatus of claim 1, wherein each of said detector circuit means includes an arrangement of parallel capacitors to increase the time to reach a given reference level corresponding to said established exposure time and further includes an adjustable resistor to increase the current in said detector circuit means so that the time required to charge said parallel capacitors is reduced.

* * * * *